United States Patent [19]
Wolfe

[11] 3,739,589
[45] June 19, 1973

[54] MATING SHEAR SEAL DEVICE FOR CONNECTING VESSELS AND THE LIKE TOGETHER

[75] Inventor: Russell C. Wolfe, Baltimore, Md.
[73] Assignee: Dixie Manufacturing Company, Inc., Baltimore, Md.
[22] Filed: June 1, 1971
[21] Appl. No.: 148,378

[52] U.S. Cl. ............... 61/69 R, 220/59, 292/144
[51] Int. Cl. ....................... E05c 1/00, B63c 11/32
[58] Field of Search ............... 61/69 R, 69 A, 465, 61/72.3, 46; 114/16, 16.6; 49/463; 292/144; 220/55, 59

[56] References Cited
UNITED STATES PATENTS

| | | | |
|---|---|---|---|
| 2,797,948 | 7/1957 | Tangard | 292/144 |
| 3,485,056 | 12/1969 | Helmas | 61/69 R |
| 2,936,592 | 5/1960 | Suderow | 292/144 X |
| 3,626,961 | 12/1971 | Quinones | 292/144 X |

*Primary Examiner*—J. Karl Bell
*Attorney*—Lawrence J. Winter

[57] ABSTRACT

Means for quickly connecting two vessels and the like together in which one vessel is provided with a top hatch aperture generally of cylindrical configuration, and in which another vessel is provided with a complementary extending tubular member which is inserted into the top hatch aperture. The other vessel is provided with outwardly extending flange means that contact the opposing surface of the top hatch aperture so that the two vessels mate in a position to be locked together. The top hatch aperture is provided with a plurality of arcuate shear slab members disposed in arcuate recesses on the inner periphery of the top hatch aperture. Radially extending piston means having their inner ends secured to the shear slab members are operatively connected to the shear slab members to retract them into their respective recesses and to actuate them radially inwardly toward the extending cylindrical portion of the second mentioned vessel, and into complementary peripheral recesses therein so as to lock the two vessels together. The top hatch aperture is further provided with liquid sealing means including resilient gasket means which bear against the shoulder of the other vessel and with fluid pressure supply means in communication with a recess in which said gasket means is disposed so as the force the gasket means into contact with the other vessel to provide a fluid tight and liquid tight seal there between.

2 Claims, 4 Drawing Figures

INVENTOR.
RUSSELL C. WOLFE
BY
Lawrence J. Winter
ATTORNEY

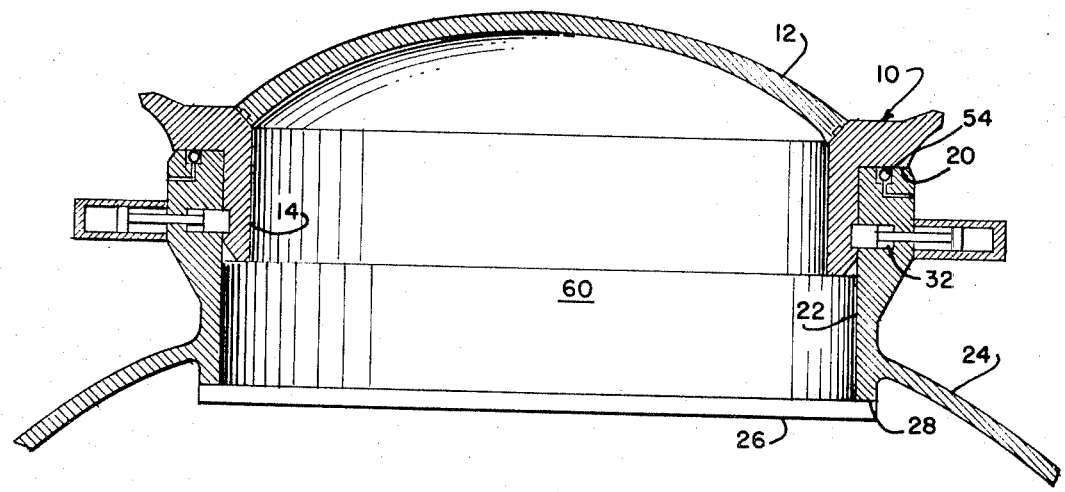
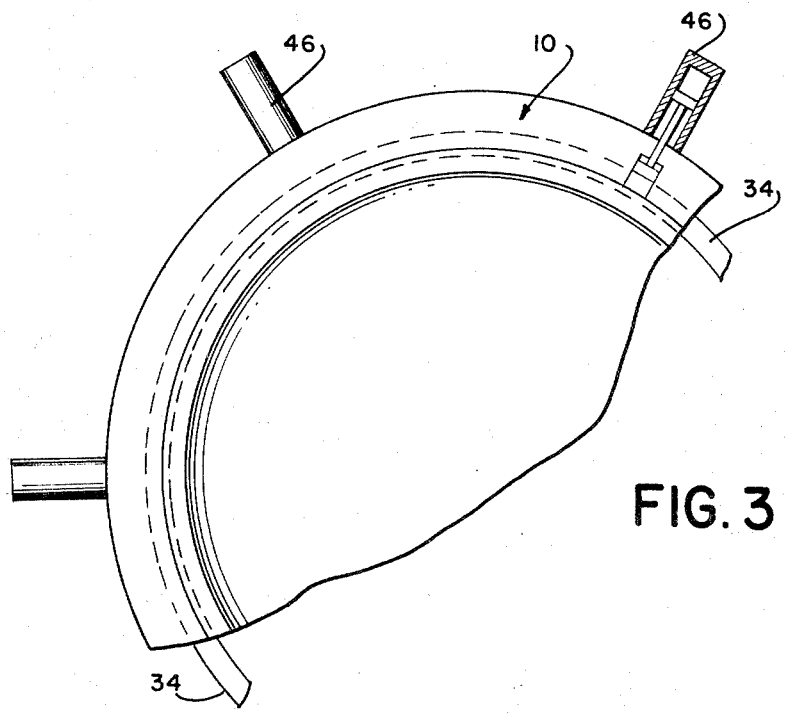

MATING SHEAR SEAL DEVICE FOR CONNECTING VESSELS AND THE LIKE TOGETHER

The present invention relates to means for quickly connecting two vessels together in a fluid and liquid tight relationship wherein the vessels are disposed in a high pressure area, such as when a diving bell is connected to a deck chamber connection underwater and the like.

It is an object of the present invention to provide a joint connection means for quickly connecting two vessels under high pressure together in a most efficient manner so as to provide a rigid and strong connection between the two vessels as well as to provide a liquid tight and fluid tight seal between the vessels.

It is another object of the present invention to provide a joint connection for two separate members in which the joint is provided by utilizing a plurality of shear slab members that can be retracted into a plurality of recesses in one of the vessels at one time so that the vessels can be quickly disconnected, and which shear slab members can be positioned to extend outwardly of the recesses in which they are disposed so as to engage the other vessel in a manner to lock the two vessels securely in place at another time.

It is another object of the present invention to provide a quick joint connection for a diving bell to be connected to a deck chamber connection underwater so that the diving bell or personnel transfer capsule vessel can be used to transfer aquanauts from the personnel transfer diving bell or capsule to the deck decompression chamber in a quick manner so that the aquanauts can be thereafter transferred into the main chamber of the deck decompression shell or vessel.

It is yet another object of the present invention to provide a quick joint connection means between two vessels under high pressure conditions in which a plurality of mating shear slab members are disposed around the joint connection of the two vessels to be secured or locked together so that the failure of one of the shear slab members or its operating mechanism will in no way interfere with a proper locking together of the two vessels in a liquid and fluid tight relationship.

It is yet another object of the present invention to provide a quick connecting device for securing together two vessels under water and under high pressure which provides a fluid and liquid tight connection by the utilization of resilient gasket means in communication with fluid under pressure while simultaneously providing a joint connection having mating shear slab means of a high strength character.

It is yet another object of the present invention to provide a quick joint connection for diving bells and other vessels to which it is to be connected in a fluid and liquid tight relationship, which is relatively inexpensive in construction and comprises very few parts and may be quickly and inexpensively applied to diving vessels and other underwater vessels now in the field, and which device is simple, strong and durable.

Various other objects and advantages of the present invention will be readily apparent from the following detailed description, when considered in connection with the accompanying drawings forming a part thereof, and in which:

FIG. 2 is a view similar to FIG. 1, but illustrating the diving bell and the deck decompression chamber after they have been secured together in a locked relationship;

FIG. 3 is a plan view of FIG. 2; and

Figure 1:
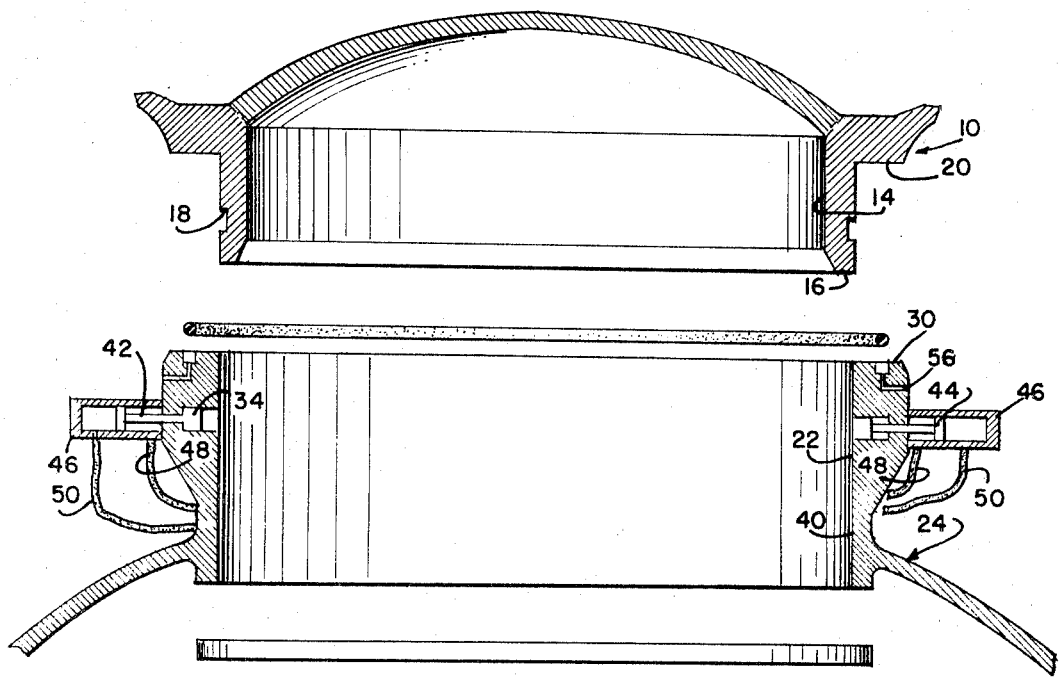
FIG. 1 is a side elevational view illustrating the diving bell and the deck decompression chamber to which it is to be joined in a fluid and liquid tight relationship before the vessels are secured to one another.

Referring to the drawings, the reference numeral 10 generally designates a diving bell or vessel with a door 12 on the bottom thereof, which closes off the hatch 14 extending outwardly of the vessel. The hatch 14 is a cylindrical ring member tapered at its lowered edge 16 and is provided with a continuous peripheral recess 18 in the outer periphery thereof adjacent the lower edge 16. Adjacent the upper edge of the hatch 14 is an outwardly extending circumferential rim forming a shoulder 20 there around. The hatch 14 is adapted to extend or to be inserted within a corresponding cylindrical hatch 22 of a deck decompression chamber of shell 24, which is secured to an underwater vessel such as an exploratory submarine vessel, not shown.

The deck decompression chamber 24 is provided with an internal door 26 of well known construction and not forming part of the invention disposed adjacent the lower edge 28 of the hatch while the upper edge 30 of the hatch forms a shoulder upon which the shoulder 20 of the diving bell hatch seats.

The upper portion of the hatch 22 is provided with a relatively wide section and has disposed on its inner circumference spaced arcuate recesses 32 in which are disposed arcuate shear slab members 34. The recesses 32 are of greater depth than the thickness 36 or width of the slab member so that the slab member can be completely enclosed within the recesses 32 so that they do not extend or protrude beyond the inner circumference or surface 40 of the hatch 22, as hereinafter described. There are preferably six circumferentially spaced slab members 34 disposed around the hatch, and each of the slab members 34 is connected to the inner end of a piston rod 42 connected at its outer end to a piston 44 disposed in a hydraulic cylinder or ram 46.

Figure 4:
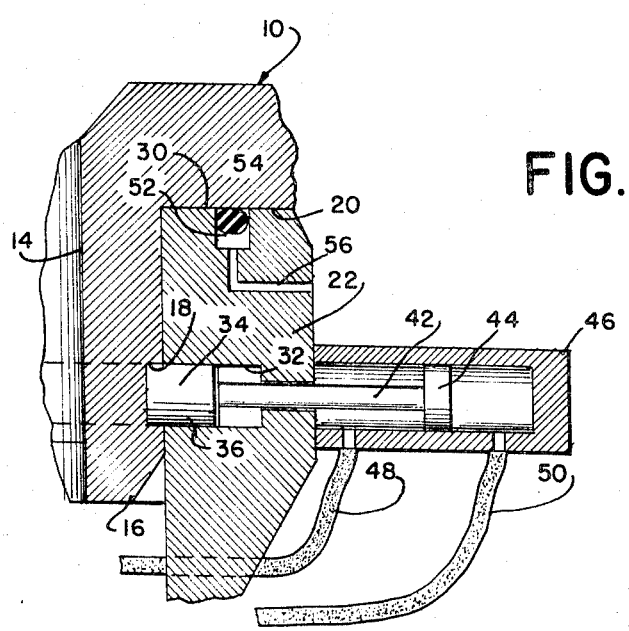
FIG. 4 is an enlarged fragmentary detailed view of the shear slab member and piston means shown in FIG. 2 when the vessels are secured together in a locked relationship.

The cylinders 46, as can be clearly seen in the drawing, extend radially outwardly of the hatch 22. The hydraulic cylinders are provided with fluid pressure lines 48 and 50 in communication with a fluid under pressure from a source, not shown, so that the piston may be moved radially outwardly of the cylinder 46 by supplying fluid under pressure through line 48 in order to retract the shear slab members 34 completely within the recesses 32 so they do not extend outwardly of the inner surface 40 of the hatch 22. When that fluid under pressure is supplied through the fluid pressure line 50 to the outer side of the piston 44, and fluid is discharged from the inner end of the cylinder 46 through the line 48, this moves the piston and the piston rod 42 and the shear slab member 36 to its innermost position, as illustrated in FIG. 4. This time, the piston extends outwardly of the surface 40 and projects into the chamber formed by the hatch 22.

The portion of hatch 22 adjacent the upper edge 30 is provided with a continuous recess 52 therein which faces the shoulder 20 of the diving vessel hatch 14. An O-ring seal 54 is disposed in the recess 52 to provide a sealing engagement with the shoulder 20 of the hatch when the parts are to be locked together. The recess 52 is in communication with a source of fluid under pressure by a plurality of small drilled passages 56 disposed in the hatch 22 so as to supply fluid under pressure to the interior of the recess 52 in order to cause the resilient O-ring member 54, which may be made of plastic material or rubber material, to flatten against the shoulder 20 of the hatch 22 to form a liquid tight seal therewith.

When it is desired to quickly join the diving vessel 10 to the deck decompression chamber 24 in order to transfer a diver or an aquanaut from the diving vessel to the deck decompression chamber, the deck decompression chamber 24 which sets on the deck of a ship has the diving bell set down on it, by lowering the bell until it is disposed in alignment with the opening provided by the hatch 22. Thereafter, the hatch 14 is lowered or inserted into the hatch 22 until the shoulder 20 sets on or abuts against the corresponding shoulder 20 of the hatch 22.

At this time, the pistons 44 are disposed in their outermost position or in a retracted position so that the arcuate shear slab members 34 are completely enclosed within the recesses 32 and do not extend beyond the surface 40 of the hatch 22.

Thereafter, to quickly lock the two vessels together the pistons are moved inwardly by applying fluid under pressure through the fluid pressure lines 50 to the cylinders 46 so as to move the pistons 44 in a radially inwardly direction, and to move the shearing slab members 34 attached to the piston rods 42 also in a radially inwardly direction and into the corresponding peripheral recess 18 in the hatch 14 to quickly lock the two vessels together. After the connection has been made by means of the shear slab between the two vessels, the compartment 60 then formed between the diving bell door 12 and the deck chamber 24 is brought to a pressure equal to that in the two chambers, then the door may be opened. The converse is true when it is desired to disconnect these. The door 12 may be opened and the door 26 may be opened, by any well known means so that the diver or aquanaut may be transferred from the diving vessel 10 to the deck decompression chamber 22. After the transfer has been made, the door 26 may then be closed and fluid under pressure may be supplied to the lines 48 and discharged through the lines 50 so as to move the pistons 44 into their retracted position and to again move the shear slab members 36 into their retracted position within the recesses 32 so that the diving bell may be raised and disconnected from the deck decompression chamber hatch 22.

Thus, from the foregoing description it is apparent that the present invention provides an economical and inexpensive apparatus for quickly connecting two vessels under high pressure to one another utilizing a plurality of retractable shear slab members in one vessel, so as to supply the high strength necessary to completely maintain the vessels together in a locked position, and to further supply fluid under pressure to a resilient gasket member which is disposed between two shoulders of the vessels in order to supply the fluid tight relationship necessary in the device.

Inasmuch as various changes may be made in the form, location and relative arrangement of the several parts, without departing from the essential characteristics of the invention, it will be understood that the invention is not meant to be limited except by the scope of the appended claims.

What is claimed is:

1. A cylindrical diving member and cylindrical deck decompression submarine vessel, said diving member and vessel having annular horizontal flat abutting shoulders adjacent their outer circumferences, a continuous recess disposed in the surface of said decompression vessel, a deformable ring gasket means in said recess, fluid pressure means in communication with said gasket means to cause said gasket means to deform and form a fluid tight seal between said abutting shoulders, a plurality of elongated circumferentially spaced recesses in the inner periphery of said decompression vessel, horizontal elongated arcuate shear members disposed in said vessel recesses, corresponding elongated arcuate recesses disposed in the outer circumference of said diving member below its shoulder adapted to receive said shear members to lock said member together with said decompression vessel, horizontal piston rods secured to the outer circumference of said shear members, pistons secured to said rods and disposed in horizontal cylinders extending outwardly of said decompression vessel and secured thereto, and fluid pressure means in communication with said cylinders to move said shear members into said diving member recesses at one time and to retract them into said decompression vessel recesses at another time.

2. The device of claim 1 wherein there are at least six shear members.

* * * * *